United States Patent [19]

Hass

[11] Patent Number: 4,931,938

[45] Date of Patent: Jun. 5, 1990

[54] MICROCOMPUTER CONTROLLED FAUCET

[76] Inventor: David Hass, 126 Second St., Troy, N.Y. 12180

[21] Appl. No.: 837,500

[22] Filed: Mar. 7, 1986

[51] Int. Cl.$^5$ ............................................. G05D 23/00
[52] U.S. Cl. ...................................... 364/152; 364/510; 236/12.12
[58] Field of Search ............... 364/557, 465, 152, 510; 318/685; 236/12.1, 12.12

[56] References Cited

U.S. PATENT DOCUMENTS

| | | | |
|---|---|---|---|
| 3,091,393 | 5/1963 | Sparrow | 235/12.1 |
| 3,721,386 | 3/1973 | Brick et al. | 236/12.12 |
| 3,974,434 | 8/1976 | Yablonski | 318/685 |
| 4,091,316 | 5/1978 | Friedman | 318/685 |
| 4,110,827 | 8/1978 | Shavit | 364/557 |
| 4,114,442 | 9/1978 | Pratt | 364/557 |
| 4,322,031 | 3/1982 | Gehlert | 236/12.1 |
| 4,330,081 | 5/1982 | McMillan | 236/12.1 |
| 4,359,186 | 11/1982 | Kiendl | 137/88 |
| 4,406,401 | 9/1983 | Nettro | 236/12.12 |
| 4,420,811 | 12/1983 | Tarnay et al. | 364/502 X |
| 4,421,269 | 12/1983 | Ts'ao | 219/308 |
| 4,499,920 | 2/1985 | Steffan et al. | 318/685 |
| 4,528,709 | 7/1985 | Getz et al. | 236/12.12 |
| 4,532,601 | 7/1985 | Lenderking et al. | 364/557 |
| 4,541,562 | 9/1985 | Zukausky | 137/490 |
| 4,547,977 | 10/1985 | Tenedini et al. | 236/12.12 |
| 4,558,817 | 12/1985 | Kiendl | 236/12.12 |
| 4,563,780 | 1/1986 | Pollack | 137/392 X |
| 4,588,308 | 5/1986 | Saito | 364/571 |
| 4,629,968 | 12/1986 | Butts et al. | 322/29 |
| 4,633,413 | 12/1986 | Caveney et al. | 73/863.01 |
| 4,635,844 | 1/1987 | Barrett et al. | 236/12.12 |
| 4,643,350 | 2/1987 | Deschaaf et al. | 236/12.12 |
| 4,682,728 | 7/1987 | Oudenhoven et al. | 236/12.12 |
| 4,693,415 | 9/1987 | Sturm | 236/12.12 |
| 4,696,428 | 9/1987 | Shakalis | 236/12.12 |
| 4,700,884 | 10/1987 | Barrett et al. | 236/12.12 |

OTHER PUBLICATIONS

Series 790 Remote Showering System; ITT Lawler; Mt. Vernon, N.Y.

*Primary Examiner*—Allen MacDonald
*Attorney, Agent, or Firm*—Robert J. Jarvis

[57] ABSTRACT

A faucet supplies water at a computer controlled temperture. Hot and cold water valves are connected to hot and cold water supplies. A mixing connection is attached between the valves for mixing the hot and cold water together and supplying it at a faucet discharge. Each valve has a movable valve member which can be moved toward and away from a valve seat to control the flow of hot or cold water. A stepper motor is connected to each of the valve members and can be controlled by a digital error signal to rotate, in steps, either to increase or decrease the flow of hot or cold water. A temperature sensor is provided at the faucet outlet for sensing the actual temperature. A microcomputer receives signals corresponding to the actual temperature. The actual temperature is compared to a selected set point temperature which is programmed into the microcomputer. If an error exists between the actual and set point temperatures, control signals are supplied to the stepper motors for changing the flow of hot or cold water to move the actual temperature toward the set point temperature.

8 Claims, No Drawings

MICROCOMPUTER CONTROLLED FAUCET

FIELD AND BACKGROUND OF THE INVENTION

The present invention relates in general to fluid mixing controls, and in particular to a new and useful device for mixing hot and cold fluid together in a computer regulated manner so as to produce a mixture having a selected temperature with a high degree of accuracy and with a short response time.

Arrangements are known for mixing hot and cold water together to produce mixed water having a selected temperature. U.S. Pat. No. 4,359,186 to Kiendel discloses a mixing valve arrangement which utilizes motor driven valves to supply hot and cold water to a mixing chamber of a water faucet. Temperature of the water in the mixing chamber is detected and used, along with the flow of fluid through the mixing chamber, as a control signal in an analog circuit for controlling the motors.

The Kiendel patent does not disclose the usefulness of a microcomputer which can be programmed to a selected temperature setpoint.

Additional U.S. patents which are relevant to the present invention include U.S. Pat. No. 4,429,422 to Wareham; U.S. Pat. No. 4,277,832 to Wong; and U.S. Pat. No. 4,189,792 to Veach.

Wareham uses an open loop system which does not utilize a temperature signal fed back from the faucet outlet. Wong utilizes a microprocessor for controlling the flow of fuel to a fuel nozzle. Veach, while controlling the flow of hot and cold water to a faucet, does not use closed loop feedback control. U.S. Pat. No. 4,383,551 to Lynch et al also discloses a liquid mixing device where valves are electronically controlled. This device uses pulsed jets of hot and cold water which are regulated by solenoid valves. It takes approximately twenty seconds for the device to change temperatures from 100 to 65 deg F. and several additional measures are necessary to dampen the violent impulses caused by pulsing liquids.

SUMMARY OF THE INVENTION

The present invention concerns a faucet which includes computer controlled valves for regulating the flow of hot and cold fluids so as to produce a mixed fluid having an accurately controlled temperature. The invention is particularly useful for water faucets but may be used in other situations where the temperature of a fluid must be controlled.

By using a microcomputer which is programmable, far greater flexibility is achieved than in systems using analog controls. Control algorithms can be utilized for controlling the valves in a proportional, proportional plus integral, proportional plus integral plus derivative, feed forward, or other control manner.

The program even responds to environmental conditions or may vary the output temperature at selected intervals. Various time-temperature-flow patterns can easily be programmed, for example where used in a rehabilitative procedure for persons with bone fractures. In such rehabilitative procedures, the injured limb is alternately bathed with hot and cold water that is being supplied from two separate faucets. A closely regulated pattern can easily be established utilizing the microcomputer controlled faucet of the present invention.

The computer controlled faucet of the invention can even be controlled by a remote computer communicating with the device through conventional serial or parallel data ports.

A simple electronic keyboard and electronic display can be utilized for easily inputting information into the microcomputer and receiving data from the microcomputer. The use of a microcomputer also permits application of speech synthesis and voice recognition circuits that are now being developed for other fields, that can permit voice control of the temperature. For example, if the faucet of the invention is being used in a shower, the user may simply say "shower hotter" to increase water temperature.

Accordingly, an object of the present invention is to provide a faucet with computer controlled temperature which comprises hot and cold fluid valves each having a valve seat and a valve member movable with respect to the valve seat, a stepper motor connected to each valve member, hot and cold fluid supply connections connected to the hot and cold fluid valves, a mixing connection connected between the valves for receiving the flows of hot and cold fluid, a temperature sensor connected to the mixing connection for sensing the actual temperature of fluid therein and a microcomputer programmed to compare the actual temperature to a selected temperature for generating control signals for the stepper motors to move the actual temperature toward the selected temperature.

The temperature sensor, preferably in the form of a thermocouple, has an output which is amplified and then supplied to an analog-to-digital converter to produce a digital signal corresponding to the temperature.

Stepper motors are utilized since they operate quickly and hold a chosen position with a very high holding torque. The stepper motor size and step increments were chosen for the torque requirements and the fineness of motion control required for achieving precise temperature control. Manually rotatable knobs are also connected to the shafts of the motors for manually controlling the faucet and in cases where the overall flow of fluid was to be increased manually, while maintaining temperature control.

A further object of the invention is to provide a faucet with computer controlled temperature which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a schematic block diagram of the faucet with computer temperature control in accordance with the present invention;

FIG. 2 is a sectional view of a valve and stepper motor arrangement in accordance with the invention;

FIG. 3 is a schematic representation of a circuit for driving the stepper motors of the invention;

FIG. 4 is a schematic representation of a circuit for generating a temperature signal and including a microcomputer for using the temperature signal to form a control signal for the stepper motors; and FIG. 5 is a flowchart showing the operation of the invention.

DESCRIPTION OF THE PREFERRED EMBODIMENT

Referring to the drawings in particular, the invention embodied in FIG. 1 comprises a computer controlled fluid or water faucet generally designated 10 having a hot water supply connection 12 and a cold water supply connection 14. The hot and cold water supply connections 12 and 14 are connected respectively to water valves 20 and 22. The water valves have outlets which are interconnected by a mixing connection 16. A faucet outlet 18 is connected to mixing connection 16 for discharging a mixture of hot and cold water.

A thermocouple 40 is connected at outlet 18 and returns a signal over a line 42 to an amplifier and conditioner circuit 44. The amplified and conditioned signal is then supplied to an analog-to-digital converter 46. A digital signal corresponding to the actual temperature in outlet 18 is then supplied over line 48 to a microcomputer 50. Microcomputer 50 is programmed by a program algorithm schematically shown at 52 which is capable of generating, in microcomputer 50, an appropriate control signal which is applied to a logic circuit 56 over a line 54. Logic circuit 56 provides appropriate control signals to power transistors 58 which are connected to the stepper motors of the valves 20 and 22.

In accordance with the invention, program 52 includes a selected set point temperature. When the actual temperature at thermocouple 40 is different from the set point temperature, the digital control signal on line 54 is generated to follow a proportional plus integral control signal M, which satisfies the following equation:

$$M = Kp \left( E + Ki \int_o^t E \, dt \right) \quad (1)$$

where
M = feedback signal (amount of correction for valves);
E = measured temperature error;
Kp = proportional control constant;
Ki = integral control constant; and
dt = small change in time.

The measured temperature error E follows the equation:

$$E = Ta - Ts \quad (2)$$

where
Ta = actual temperature; and
Ts = selected set point temperature.

FIG. 2 shows the valve 20 for the hot water, and its associated parts. Valve 22 is identical so that only valve 20 will be explained in detail.

Valve 20 includes a valve housing 30 having an inlet opening 31, an outlet opening 32 and a valve seat 33. A movable valve member 34 is slidable in an axial bore 35 of the valve housing 30. An O-ring seals the valve member 34 to the bore 35. Valve member 34 has a seal 36, that may be rigid or flexible (e.g. of nylon). Valve member 34 also has a threaded stem 37 which is threaded into a threaded tube 38 that is fixed to the shaft 62 of a stepper motor 60. Stepper motor 60 has a housing which is fixed to the housing 30 of the valve 20. A 12 volt DC unipolar AIRPAX brand stepper motor with 200 steps per revolution maybe utilized as stepper motor 60. It produces a holding torque of 55 oz. in.

The stepper motor 60 has a permanent magnet and multiple coils which can be energized in specific order to make the motor shaft 62 rotate stepwise, either clockwise or counterclockwise. The motor operates quickly and holds its chosen position with a high holding torque noted above. Each incremental stepwise rotation of shaft 62 causes valve member 34 to move either closer to or further away from valve seat 33.

To provide manual operation which is used either in conjunction with the electronic computer control, or as an alternative to the electronic computer control, a knob 63 is fixed to the end of shaft 62 opposite from threaded tube 38.

Although any temperature sensor capable of producing a compatible signal can be utilized, a two wire thermocouple is preferred for thermocouple 40, due to its speed of response to a temperature change. A thermocouple works by connecting the ends of two special metal alloys together. If the ends are at different temperatures, a voltage proportional to the temperature difference is developed. The signal is applied to line 42 and processed by amplifier and conditioner 44.

In addition to the fact that the output of the thermocouple is very low and requires amplification, a reference temperature is needed for one end of the thermocouple so that the change in temperature at the other end can be compared to a reference value. The thermocouple circuit used in accordance with the present invention may comprise a FLUKE TK 80 brand thermocouple module which can be connected to a volt meter set in a millivolt range. Temperatures read out directly in degrees, the scale equalling 10 millivolts per degree. In this device, circuitry is included to simulate one end of the thermocouple being in a bath of ice water. The circuit is referred to as a cold reference junction compensator circuit. The 10 millivolt: per degree output is insufficient, however, to drive the A/D converter 46 so that, as shown in FIG. 4, the signal from the thermocouple circuit is amplified using a quad op amp 66. This produces an amplification factor of approximately 27 times. The invention may also utilize a model AD 595 thermocouple module which is available from Analog Devices of Norwood, Mass.

The A/D converter 46, shown in FIG. 4, receives the output signal from op amp 66 and from it generates an 8 bit digital signal. In the converter used, the reference voltage range was adjusted so that a temperature of 60 deg F. produced the digital number zero and a temperature of 125 deg F. produced the digital number 255, in digital form. The temperature range selected was arbitrary and any appropriate range could be used. The 8 bit digital number is supplied over line 48 to the microcomputer 50.

The microcomputer 50 may comprise a 502 microprocessor which is found in the SYM (a trade name) microcomputer experimentation unit and in the APPLE IIe (a trade name) computer. The Apple IIe was used as a software development system. The programmer enters assembly language mnemonics into the computer using an editor program. An assemble program converts the assembly language mnemonics into machine language code. Another program may be utilized which transfers the machine language code from memory in the Apple, via an RS-232C interface, to the microcomputer.

Commercial models of the invention should use nonvolatile erasable programmable read only memories (EPROMs) for permanent program storage. In this case an EPROM programmer card will be installed in the Apple or another computer system. The control program for the computer controlled faucet will be "burned in" into the EPROM. The EPROM, a single integrated circuit chip, will then be removed from the EPROM programmer and installed directly into the microcomputer circuit board. Then the program is permanently installed. For mass production, read only memories (ROMs) can be used.

As shown in FIG. 1, the control signal 54 from microprocessor 50 is applied to a logic circuit 56. This circuit applies control signals to power transistors 58 which are connected to power the various coils in stepper motor 60, in a correct sequence to produce a correct incremental rotation. The circuit of FIG. 3 is shown for the hot stepper motor 60 with an identical circuit (not shown) being used for the cold stepper motor.

The logic circuit 56 comprises a pair of flip-flops each having a control input D for receiving a signal from an exclusive OR gate of its own. The Q and Q̄ outputs of the flip-flops are connected through inverters 59 to the bases of power transistors 58.

Each exclusive OR gate 53 has one input connected to the line 54 and another input connected to either the inverting or the noninverting output of one of the flip flops 51.

The program used to drive microcomputer 50 was structured as a list of subroutines to facilitate writing, editing and testing of the device. Each of the subroutines is listed below with its label and a short description of its purpose.

Subroutines:

PILOT—calls the initialization routine, then the turn on routine, then the control routine. It is the main program for the system. Other pilot routines may use interrupts to enable keyboard access and display.

ADD—performs 16 bit addition.

SUBTR—performs 16 bit subtraction.

MULT—multiplies two 8 bit numbers yielding a 16 bit result.

DIVIDE—divides two 16 bit numbers with a 16 bit result.

PAUSE—a programmed delay to limit the frequency of the pulses delivered to the stepper motors to about 300 hertz. Without a pause the frequency would be higher than the maximum speed of the stepper motors.

CYCLE—sends the motor signals to the input/output port.

MOVE—takes the number of steps and the direction, and sends them in the proper form to the cycle subroutine.

TURNON—calculates an approximate initial position to turn the valves on and sends the information out to open the valves.

TURNOFF—gets the current position of the valves, and closes them to stop the flow of water.

LONGWT—used for long delays.

AVGTMP—reads the temperature from the input port 100 times, and divides by 100 to get the average temperature. Spurious signals and noise are thereby minimized.

ABS—computes the absolute value, interpreting numbers greater than 127 as negative, and numbers less than 128 as positive. The highest 8 bit number is 255.

INCLIM—limits the increments so the valves do not travel out of the range of 0 to 1.25 revolutions. 1.25 revolutions is full flow, while zero is off.

CONTRL—implements a proportional control algorithm, with the positions of the valves acting like a summation, or an integral control algorithm.

ERRCAL—computes the response to a temperature error.

DISPT—displays the current temperature and pauses the program.

INIT—zeroes all variables and then sets certain variables to specific values needed by the program.

FIG. 5 shows a flowchart of the operation of the program.

The following table shows some of the results which were found in operating the invention:

TABLE

| Set point deg F. | Approx. Mean deg F. | Temperature Range | | Response time to settle seconds |
|---|---|---|---|---|
| | | Min. Disturb. deg F. | Max Disturb. deg F. | |
| 75 | 75.0 | 74.5–75.3 | 73–82 | 3.00 |
| 80 | 80.0 | 79.7–80.5 | 74–92 | 2.45 |
| 85 | 85.0 | 84.4–85.6 | 76–95 | 3.20 |
| 90 | 90.0 | 89.4–90.2 | 80–96 | 2.55 |
| 95 | 95.0 | 94.4–95.6 | 86–99 | 2.36 |
| 100 | 99.6 | 99.3–99.8 | 88–102 | 1.91 |

In the table the first column shows the temperature which was programmed into the computer. The second column shows the mean temperature actually obtained. This value was ascertained by looking at a thermometer which was positioned to measure the temperature near thermocouple 40 at the outlet 18 of the faucet. The third column (Min. Disturb.) shows the results in temperature when both supply valves 15 were on full and no changes were made to them for several minutes. The temperature fluctuated in the range shown. The fourth column (Max. Disturb.) shows the results when flow on the hot water line was manually turned off and then on quickly. Valve 20 was not operated to make the disturbance but rather supply valves 15 were connected to the hot and cold water supply lines upstream of the device. These valves were the ones manually operated to provide the disturbances. At the extreme temperature readings the flow was so small as to be unimportant. The valves of the invention faucet close off the flow very quickly in their automatic response to this manual manipulation. The last column shows the elapsed time between when the hot water supply line valve 15 was turned on and when the temperature readout showed a stable temperature again.

The foregoing results show the accuracy and quick response time which is achieved in accordance with the present invention.

There was found to be a very short lag time between a manual change in position for one of the supply valves and an automatic operation to restore the temperature to its selected value. It was originally thought that the time needed for the automatic change in position for the faucet valve would limit the system to about 4 updates per second. In other words, a finite amount of time is needed for the water to go from the valves to the thermocouple. It was anticipated that this time lag would be the factor which would limit the system response time. ((Distance=6 in)/(water velocity=30 in/sec) or 1/5 second). By experimentation it was found that stable, fast response could be obtained by sampling at the highest rate possible. The system that was tested was asynchronous, that is, the time between samples was determined by the length of time needed to move the motors. If the last sampling found zero error and no motion was sent to the motors, then the system would recheck the temperature as fast as the microprocessor operated, that is on the order of hundreds of times per second. If the valves had to be positioned then the sampling rate could be as low as 30 hertz. The process lag is thought to be caused not by water flow but by the time needed for the thermocouple to respond to a temperature change.

At the end of this disclosure is a printout of a control program which is mentioned above. The listing includes assembly language mnemonics and machine language code. The columns in the program are as follows. The first column is the memory location or address for the instruction which follows it in the second, third and fourth columns. For example, 02F5:AD 32 02 means that in memory locations 02F5, 6 and 7 are the machine language codes AD, 32 and 02. The number in parentheses in the 6th column is the number of 1 microsecond clock cycles needed to process the instruction on that line. The next column is the line number in the editor. It is just for reference. The next column is reserved for subroutine names. These labels are for the assembler and the programmer. The next two columns are for the assembly language mnemonic, such as STA NUMLO, where STA is an instruction to store the number in the accumulator to a memory location associated with the label NUMLO, which was defined earlier in the program. The last column is for comments.

Conceptually, the material on the right hand side of the page is like FORTRAN source code, and the material on the far left is the object code prepared by the compiler.

While a specific embodiment of the invention has been shown and described in detail to illustrate the application of the principles of the invention, it will be understood that the invention may be embodied otherwise without departing from such principles.

```
SOURCE     FILE #01   POSSUM1
0000:                    1  * WATER TEMP CONTROL
0000:                    2  * DEVICE PROGRAM FOR SYM
0000:                    3  * MICROCOMPUTER
0000:                    4  * COPYRIGHT 1986 DAVE HASS
0000:                    5  * JULY 31,1985
0000:                    6  * UPDATED FEBRUARY 10, 1986
0000:                    7  * NAME =POSSUM1
0000:                    8       LST     ON,C
0000                     9  * VARIABLE LIST
0000:                   10  *
0000:      0200         11  TC      EQU     $0200
0000:      0201         12  TH      EQU     $0201
0000:      0202         13  CPOS    EQU     $0202
0000:      0203         14  HPOS    EQU     $0203
0000:      0204         15  TOTPOS  EQU     $0204
0000:      0205         16  TSP     EQU     $0205
0000:      0206         17  ERR     EQU     $0206
0000:      0207         18  CURTMP  EQU     $0207
0000:      0208         19  KPRO    EQU     $0208
0000:      0209         20  KINT    EQU     $0209
0000:      020A         21  DTIM    EQU     $020A
0000:      020B         22  CSTEPS  EQU     $020B
0000:      020C         23  HSTEPS  EQU     $020C
0000:      020D         24  AL      EQU     $020D
0000:      020E         25  AH      EQU     $020E
0000:      0210         26  TEMPA   EQU     $0210
0000:      0211         27  TEMPX   EQU     $0211
0000:      0212         28  TEMPY   EQU     $0212
0000:      0213         29  ADD1L   EQU     $0213
0000:      0214         30  ADD1H   EQU     $0214
0000:      0215         31  ADD2L   EQU     $0215
0000:      0216         32  ADD2H   EQU     $0216
0000:      0217         33  SUML    EQU     $0217
0000:      0218         34  SUMH    EQU     $0218
0000:      0219         35  TEMP    EQU     $0219
0000:      021A         36  HRSLT   EQU     $021A
0000:      021B         37  LRSLT   EQU     $021B
```

```
0000:    021C     38 MPLIER  EQU   $021C
0000:    021D     39 MPLCND  EQU   $021D
0000:    021E     40 EPART   EQU   $021E
0000:    021F     41 APART   EQU   $021F
0000:    0220     42 INCTMP  EQU   $0220
0000:    0221     43 RSLT    EQU   $0221
0000:    0222     44 RMDR    EQU   $0222
0000:    0223     45 ONWAIT  EQU   $0223
0000:    0224     46 CMAX    EQU   $0224
0000:    0225     47 CDIR    EQU   $0225
0000:    0226     48 HDIR    EQU   $0226
0000:    0227     49 CCLK    EQU   $0227
0000:    0228     50 HCLK    EQU   $0228
0000:    0229     51 PULSE   EQU   $0229
0000:    022A     52 WAIT    EQU   $022A        SUM DX SG
0000:    022B     53 X1      EQU   $022B
0000:    022C     54 ESIGN   EQU   $022C
0000:    022D     55 ASIGN   EQU   $022D
0000:    022E     56 ETEMP   EQU   $022E
0000:    0230     57 DLO     EQU   $0230
0000:    0231     58 DHI     EQU   $0231
0000:    0232     59 NUMLO   EQU   $0232
0000:    0233     60 NUMHI   EQU   $0233
0000:    0234     61 RMDRLO  EQU   $0234
0000:    0235     62 RMDRHI  EQU   $0235
0000:    0236     63 INC     EQU   $0236
0000:    0237     64 MOTTEMP EQU   $0237
0000:    0239     65 CCOIL0  EQU   $0239
0000:    023A     66 CCOIL1  EQU   $023A
0000:    023B     67 CCOIL2  EQU   $023B
0000:    023C     68 CCOIL3  EQU   $023C
0000:    023D     69 CCOIL4  EQU   $023D
0000:    023E     70 CREF    EQU   $023E
0000:    023F     71 HREF    EQU   $023F
0000:    0240     72 TTOTL   EQU   $0240
0000:    0241     73 TTOTH   EQU   $0241
0000:    0242     74 MINPOS  EQU   $0242
0000:    0243     75 MAXPOS  EQU   $0243
0000:    0244     76 INCPLUS EQU   $0244
0000:    0245     77 CSTEPN  EQU   $0245
0000:    0246     78 DUMMY   EQU   $0246
0000:    0247     79 ABSSGN  EQU   $0247
0000:    0248     80 ERRSGN  EQU   $0248
0000:    0249     81 HCOIL0  EQU   $0249
0000:    024A     82 HCOIL1  EQU   $024A
0000:    024B     83 HCOIL2  EQU   $024B
0000:    024C     84 HCOIL3  EQU   $024C
0000:    024D     85 HCOIL4  EQU   $024D
0000:    024E     86 COLDJ   EQU   $024E
0000:    024F     87 HOTJ    EQU   $024F
0000:    A800     88 MOTOR   EQU   $A800
0000:    A801     89 ADCVTR  EQU   $A801
0000:    A802     90 MOTDDX  EQU   $A802
0000:    A803     91 ADCDDX  EQU   $A803
0000:    A656     92 TV      EQU   $A656
0000:             93 *END OF LIST OF VARIABLES
0000:             94 *
```

```
0000:                         95 *PILOT SUBROUTINE*******
0000:                         96 *CONTROLS THE PROGRAM
0000:                         97 *
----- NEXT OBJECT FILE NAME IS POSSUM1.0
0250:            0250         98        ORG     $250
0250:20 2A 06    (6)          99 PILOT  JSR     INIT
0253:20 EB 03    (6)         100        JSR     TURNON
0256:20 46 05    (6)         101        JSR     CONTRL
0259:                        102 *
0259:                        103 *SUBROUTINE ADD***********
0259:                        104 *
0259:20 88 81    (6)         105 ADD    JSR     SAVER
025C:18          (2)         106        CLC
025D:D8          (2)         107        CLD
025E:AD 13 02    (4)         108        LDA     ADD1L
0261:6D 15 02    (4)         109        ADC     ADD2L
0264:8D 17 02    (4)         110        STA     SUML
0267:AD 14 02    (4)         111        LDA     ADD1H
026A:6D 16 02    (4)         112        ADC     ADD2H
026D:8D 18 02    (4)         113        STA     SUMH
0270:4C C4 81    (3)         114        JMP     RESALL
0273:20 88 81    (6)         115 SUBTR  JSR     SAVER
0276:D8          (2)         116        CLD
0277:38          (2)         117        SEC
0278:AD 13 02    (4)         118        LDA     ADD1L
027B:ED 15 02    (4)         119        SBC     ADD2L
027E:8D 17 02    (4)         120        STA     SUML
0281:AD 14 02    (4)         121        LDA     ADD1H
0284:ED 16 02    (4)         122        SBC     ADD2H
0287:8D 18 02    (4)         123        STA     SUMH
028A:4C C4 81    (3)         124        JMP     RESALL
028D:                        125 *
028D:                        126 *SUBROUTINE MULT*********
028D:                        127 *
028D:20 88 81    (6)         128 MULT   JSR     SAVER
0290:A9 00       (2)         129        LDA     #0
0292:8D 1B 02    (4)         130        STA     LRSLT
0295:A2 08       (2)         131        LDX     #8
0297:4E 1C 02    (6)         132 MLOOP  LSR     MPLIER
029A:90 04    02A0(3)        133        BCC     NOADD
029C:18          (2)         134        CLC
029D:6D 1D 02    (4)         135        ADC     MPLCND
02A0:6A          (2)         136 NOADD  ROR     A
02A1:6E 1B 02    (6)         137        ROR     LRSLT
02A4:CA          (2)         138        DEX
02A5:D0 F0    0297(3)        139        BNE     MLOOP
02A7:8D 1A 02    (4)         140        STA     HRSLT
02AA:4C C4 81    (3)         141        JMP     RESALL
02AD:                        142 *
02AD:                        143 *SUBROUTINE DIVISION*****
02AD:                        144 *
02AD:20 88 81    (6)         145 DIVIDE JSR     SAVER
02B0:A9 00       (2)         146        LDA     #0
02B2:8D 34 02    (4)         147        STA     RMDRLO
02B5:8D 35 02    (4)         148        STA     RMDRHI
02B8:A2 10       (2)         149        LDX     #$10
```

```
02BA:0E 32 02      (6)   150 NXTBT  ASL   NUMLO
02BD:2E 33 02      (6)   151         ROL   NUMHI
02C0:2E 34 02      (6)   152         ROL   RMDRLO
02C3:2E 35 02      (6)   153         ROL   RMDRHI
02C6:AD 34 02      (4)   154         LDA   RMDRLO
02C9:38            (2)   155         SEC
02CA:ED 30 02      (4)   156         SBC   DLO
02CD:A8            (2)   157         TAY
02CE:AD 35 02      (4)   158         LDA   RMDRHI
02D1:ED 31 02      (4)   159         SBC   DHI
02D4:90 09   02DF  (3)   160         BCC   CNTDN
02D6:EE 32 02            161         INC   NUMLO
02D9:8D 35 02            162         STA   RMDRHI
02DC:8C 34 02      (4)   163         STY   RMDRLO
02DF:CA            (2)   164 CNTDN  DEX
02E0:D0 D8   02BA  (3)   165         BNE   NXTBT
02E2:4C C4 81      (3)   166         JMP   RESALL
02E5:                    167 *
02E5:                    168 *SUBROUTINE PAUSE
02E5:                    169 *
02E5:20 88 81      (6)   170 PAUSE  JSR   SAVER
02E8:A9 08         (2)   171         LDA   #$8
02EA:A2 50         (2)   172 PLOOP1 LDX   #$50
02EC:CA            (2)   173 PLOOP2 DEX
02ED:D0 FD   02EC  (3)   174         BNE   PLOOP2
02EF:38            (2)   175         SEC
02F0:E9 01         (2)   176         SBC   #1
02F2:D0 F6   02EA  (3)   177         BNE   PLOOP1
02F4:4C C4 81      (3)   178         JMP   RESALL
02F7:                    179 *
02F7:                    180 *SUBROUTINE LOGIC*********
02F7:                    181 *
02F7:20 88 81      (6)   182 LOGIC  JSR   SAVER
02FA:AD 29 02      (4)   183         LDA   PULSE
02FD:29 08         (2)   184         AND   #8
02FF:C9 00         (2)   185         CMP   #0
0301:F0 2A   032D  (3)   186         BEQ   YCOLDJ
0303:AD 29 02      (4)   187         LDA   PULSE
0306:29 04         (2)   188         AND   #4
0308:C9 00         (2)   189         CMP   #0
030A:F0 12   031E  (3)   190         BEQ   DECCJ
030C:AD 4E 02      (4)   191         LDA   COLDJ
030F:18            (2)   192         CLC
0310:69 01         (2)   193         ADC   #1
0312:C9 05         (2)   194         CMP   #5
0314:D0 02   0318  (3)   195         BNE   NOCLP
0316:A9 01         (2)   196         LDA   #1
0318:8D 4E 02      (4)   197 NOCLP  STA   COLDJ
031B:4C 2D 03      (3)   198         JMP   YCOLDJ
031E:AD 4E 02      (4)   199 DECCJ  LDA   COLDJ
0321:38            (2)   200         SEC
0322:E9 01         (2)   201         SBC   #1
0324:C9 00         (2)   202         CMP   #0
0326:D0 F0   0318  (3)   203         BNE   NOCLP
0328:A9 04         (2)   204         LDA   #4
032A:8D 4E 02      (4)   205         STA   COLDJ
032D:AC 4E 02      (4)   206 YCOLDJ LDY   COLDJ
```

```
0330:B9 39 02    (4)   207           LDA    CCOILO,Y
0333:8D 37 02    (4)   208           STA    MOTTEMP
0336:AD 29 02    (4)   209           LDA    PULSE
0339:29 02       (2)   210           AND    #2
033B:C9 00       (2)   211           CMP    #0
033D:F0 2A  0369(3)    212           BEQ    YHOTJ
033F:AD 29 02    (4)   213           LDA    PULSE
0342:29 01       (2)   214           AND    #1
0344:C9 00       (2)   215           CMP    #0
0346:F0 12  035A(3)    216           BEQ    DECHJ
0348:AD 4F 02    (4)   217  INCHJ    LDA    HOTJ
034B:18          (2)   218           CLC
034C:69 01       (2)   219           ADC    #1
034E:C9 05       (2)   220           CMP    #5
0350:D0 02  0354(3)    221           BNE    NOHLP
0352:A9 01       (2)   222           LDA    #1
0354:8D 4F 02    (4)   223  NOHLP    STA    HOTJ
0357:4C 69 03    (3)   224           JMP    YHOTJ
035A:AD 4F 02    (4)   225  DECHJ    LDA    HOTJ
035D:38          (2)   226           SEC
035E:E9 01       (2)   227           SBC    #1
0360:C9 00       (2)   228           CMP    #0
0362:D0 F0  0354(3)    229           BNE    NOHLP
0364:A9 04       (2)   230           LDA    #4
0366:8D 4F 02    (4)   231           STA    HOTJ
0369:AC 4F 02    (4)   232  YHOTJ    LDY    HOTJ
036C:B9 49 02    (4)   233           LDA    HCOILO,Y
036F:18          (2)   234           CLC
0370:6D 37 02    (4)   235           ADC    MOTTEMP
0373:8D 00 A8    (4)   236           STA    MOTOR
0376:4C C4 81    (3)   237           JMP    RESALL
0379:                  238  *
0379:                  239  *SUBROUTINE CYCLE********
0379:AD 2B 02    (4)   240  CYCLE    LDA    X1
037C:C9 00       (2)   241           CMP    #0
037E:F0 0C  038C(3)    242           BEQ    CBOT
0380:AE 2B 02    (4)   243           LDX    X1
0383:20 F7 02    (6)   244  CYTOP    JSR    LOGIC
0386:20 E5 02    (6)   245           JSR    PAUSE
0389:CA          (2)   246           DEX
038A:D0 F7  0383(3)    247           BNE    CYTOP
038C:A9 FF       (2)   248  CBOT     LDA    #$FF
038E:8D 00 A8    (4)   249           STA    MOTOR
0391:60          (6)   250           RTS
0392:                  251  *
0392:                  252  *SUBROUTINE MOVE
0392:                  253  *
0392:20 88 81    (6)   254  MOVE     JSR    SAVER
0395:AD 0B 02    (4)   255           LDA    CSTEPS
0398:CD 0C 02    (4)   256           CMP    HSTEPS
039B:F0 2F  03CC(3)    257           BEQ    MLEFT
039D:AD 0B 02    (4)   258  MRIGHT   LDA    CSTEPS
03A0:8D 2B 02    (4)   259           STA    X1
03A3:AD 25 02    (4)   260           LDA    CDIR
03A6:8D 2A 02    (4)   261           STA    WAIT
03A9:18          (2)   262           CLC
03AA:6D 27 02    (4)   263           ADC    CCLK
```

```
03AD:8D 29 02    (4)   264         STA    PULSE
03B0:20 79 03    (6)   265         JSR    CYCLE
03B3:AD 0C 02    (4)   266         LDA    HSTEPS
03B6:8D 2B 02    (4)   267         STA    X1
03B9:AD 26 02    (4)   268         LDA    HDIR
03BC:8D 2A 02    (4)   269         STA    WAIT
03BF:18          (2)   270         CLC
03C0:6D 28 02    (4)   271         ADC    HCLK
03C3:8D 29 02    (4)   272         STA    PULSE
03C6:20 79 03    (6)   273         JSR    CYCLE
03C9:4C C4 81    (3)   274         JMP    RESALL
03CC:AD 0B 02    (4)   275   MLEFT LDA    CSTEPS
03CF:8D 2B 02    (4)   276         STA    X1
03D2:AD 25 02    (4)   277         LDA    CDIR
03D5:18          (2)   278         CLC
03D6:6D 26 02    (4)   279         ADC    HDIR
03D9:8D 2A 02    (4)   280         STA    WAIT
03DC:6D 27 02    (4)   281         ADC    CCLK
03DF:6D 28 02    (4)   282         ADC    HCLK
03E2:8D 29 02    (4)   283         STA    PULSE
03E5:20 79 03    (6)   284         JSR    CYCLE
03E8:4C C4 81    (3)   285         JMP    RESALL
03EB:                  286   *
03EB:                  287   *SUBROUTINE TURNON
03EB:                  288   *
03EB:20 88 81    (6)   289   TURNON JSR   SAVER
03EE:D8          (2)   290         CLD
03EF:AD 01 02    (4)   291         LDA    TH
03F2:ED 05 02    (4)   292         SBC    TSP
03F5:8D 1C 02    (4)   293         STA    MPLIER
03F8:AD 04 02    (4)   294         LDA    TOTPOS
03FB:8D 1D 02    (4)   295         STA    MPLCND
03FE:20 8D 02    (6)   296         JSR    MULT
0401:AD 1B 02    (4)   297         LDA    LRSLT
0404:8D 32 02    (4)   298         STA    NUMLO
0407:AD 1A 02    (4)   299         LDA    HRSLT
040A:8D 33 02    (4)   300         STA    NUMHI
040D:38          (2)   301         SEC
040E:AD 01 02    (4)   302         LDA    TH
0411:ED 00 02    (4)   303         SBC    TC
0414:8D 30 02    (4)   304         STA    DLO
0417:20 AD 02    (6)   305         JSR    DIVIDE
041A:AD 32 02    (4)   306         LDA    NUMLO
041D:8D 02 02    (4)   307         STA    CPOS
0420:8D 0B 02    (4)   308         STA    CSTEPS
0423:AD 04 02    (4)   309         LDA    TOTPOS
0426:38          (2)   310         SEC
0427:ED 02 02    (4)   311         SBC    CPOS
042A:8D 03 02    (4)   312         STA    HPOS
042D:8D 0C 02    (4)   313         STA    HSTEPS
0430:A9 04       (2)   314         LDA    #04
0432:8D 25 02    (4)   315         STA    CDIR
0435:A9 01       (2)   316         LDA    #01
0437:8D 26 02    (4)   317         STA    HDIR
043A:A9 FF       (2)   318         LDA    #$FF
043C:8D 02 A8    (4)   319         STA    MOTDDX
043F:20 92 03    (6)   320         JSR    MOVE
```

```
0442:4C C4 81      (3)    321           JMP    RESALL
0445:                     322   *
0445:                     323   *SUBROUTINE TURNOFF
0445:                     324   *
0445:20 88 81      (6)    325   TURNOFF JSR   SAVER
0448:AD 02 02      (4)    326           LDA    CPOS
044B:18            (2)    327           CLC
044C:69 0A         (2)    328           ADC    #$A
044E:8D 0B 02      (4)    329           STA    CSTEPS
0451:AD 03 02      (4)    330           LDA    HPOS
0454:18            (2)    331           CLC
0455:69 0A         (2)    332           ADC    #$A
0457:8D 0C 02      (4)    333           STA    HSTEPS
045A:A9 00         (2)    334           LDA    #0
045C:8D 25 02      (4)    335           STA    CDIR
045F:8D 26 02      (4)    336           STA    HDIR
0462:A9 FF         (2)    337           LDA    #$FF
0464:8D 02 A8      (4)    338           STA    MOTDDX
0467:20 92 03      (6)    339           JSR    MOVE
046A:4C C4 81      (3)    340           JMP    RESALL
046D:                     341   *
046D:                     342   *SUBROUTINE LONGWT
046D:                     343   *
046D:20 88 81      (6)    344   LONGWT JSR    SAVER
0470:A2 FF         (2)    345   LLOOP1 LDX    #$FF
0472:A0 20         (2)    346   LLOOP2 LDY    #$20
0474:88            (2)    347   LLOOP3 DEY
0475:D0 FD   0474 (3)    348           BNE    LLOOP3
0477:CA           (2)    349           DEX
0478:D0 F8   0472 (3)    350           BNE    LLOOP2
047A:38            (2)    351           SEC
047B:E9 01         (2)    352           SBC    #1
047D:D0 F1   0470 (3)    353           BNE    LLOOP1
047F:4C C4 81      (3)    354           JMP    RESALL
0482:                     355   *
0482:                     356   *SUBROUTINE AVGTEMP
0482:                     357   *
0482:20 88 81      (6)    358   AVGTEMP JSR   SAVER
0485:A9 00         (2)    359           LDA    #0
0487:8D 40 02      (4)    360           STA    TTOTL
048A:8D 41 02      (4)    361           STA    TTOTH
048D:8D 14 02      (4)    362           STA    ADD1H
0490:A2 64         (2)    363           LDX    #$64
0492:AD 01 A8      (4)    364   AVLOOP LDA    ADCVTR
0495:8D 13 02      (4)    365           STA    ADD1L
0498:AD 40 02      (4)    366           LDA    TTOTL
049B:8D 15 02      (4)    367           STA    ADD2L
049E:AD 41 02      (4)    368           LDA    TTOTH
04A1:8D 16 02      (4)    369           STA    ADD2H
04A4:20 59 02      (6)    370           JSR    ADD
04A7:AD 17 02      (4)    371           LDA    SUML
04AA:8D 40 02      (4)    372           STA    TTOTL
04AD:AD 18 02      (4)    373           LDA    SUMH
04B0:8D 41 02      (4)    374           STA    TTOTH
04B3:CA            (2)    375           DEX
04B4:D0 DC   0492 (3)    376           BNE    AVLOOP
```

```
04B6:A9 00          (2) 377        LDA    #0
04B8:8D 31 02       (4) 378        STA    DHI
04BB:A9 64          (2) 379        LDA    #$64
04BD:8D 30 02       (4) 380        STA    DLO
04C0:AD 40 02       (4) 381        LDA    TTOTL
04C3:8D 32 02       (4) 382        STA    NUMLO
04C6:AD 41 02       (4) 383        LDA    TTOTH
04C9:8D 33 02       (4) 384        STA    NUMHI
04CC:20 AD 02       (6) 385        JSR    DIVIDE
04CF:AD 32 02       (4) 386        LDA    NUMLO
04D2:8D 07 02       (4) 387        STA    CURTMP
04D5:4C C4 81       (3) 388        JMP    RESALL
04D8:                   389 *
04D8:                   390 *ABSOLUTE VALUE SUBROUTINE
04D8:                   391 *
04D8:                   392 *RETURNS ABS IN DUMMY
04D8:                   393 *RETURNS 00 IF POS,80 IF NEG
04D8:38             (2) 394 ABS    SEC
04D9:E9 00          (2) 395        SBC    #0
04DB:8D 46 02       (4) 396        STA    DUMMY
04DE:10 0E    04EE  (3) 397        BPL    ITSPOS
04E0:A9 80          (2) 398        LDA    #$80
04E2:8D 47 02       (4) 399        STA    ABSSGN
04E5:A9 00          (2) 400        LDA    #0
04E7:38             (2) 401        SEC
04E8:ED 46 02       (4) 402        SBC    DUMMY
04EB:4C F6 04       (3) 403        JMP    FNSHD
04EE:A9 00          (2) 404 ITSPOS LDA    #0
04F0:8D 47 02       (4) 405        STA    ABSSGN
04F3:AD 46 02       (4) 406        LDA    DUMMY
04F6:8D 46 02       (4) 407 FNSHD  STA    DUMMY
04F9:60             (6) 408        RTS
04FA:                   409 *
04FA:                   410 *SUBROUTINE INCLIM
04FA:                   411 *LIMITS POSITIONING OF
04FA:                   412 *VALVES
04FA:                   413 *
04FA:20 88 81       (6) 414 INCLIM JSR    SAVER
04FD:AD 36 02       (4) 415        LDA    INC
0500:20 D8 04       (6) 416        JSR    ABS
0503:AD 47 02       (4) 417        LDA    ABSSGN
0506:C9 00          (2) 418        CMP    #0
0508:F0 0A    0514  (3) 419        BEQ    MAXCPS
050A:AD 02 02       (4) 420        LDA    CPOS
050D:38             (2) 421        SEC
050E:ED 42 02       (4) 422        SBC    MINPOS
0511:4C 1B 05       (3) 423        JMP    AAINC
0514:AD 43 02       (4) 424 MAXCPS LDA    MAXPOS
0517:38             (2) 425        SEC
0518:ED 02 02       (4) 426        SBC    CPOS
051B:CD 46 02       (4) 427 AAINC  CMP    DUMMY
051E:B0 03    0523  (3) 428        BCS    MARY
0520:8D 46 02       (4) 429        STA    DUMMY
0523:A9 10          (2) 430 MARY   LDA    #$10
0525:CD 46 02       (4) 431        CMP    DUMMY
0528:B0 03    052D  (3) 432        BCS    RECSGN
```

```
052A:8D 46 02      (4)   433        STA    DUMMY
052D:AD 47 02      (4)   434 RECSGN LDA    ABSSGN
0530:C9 00         (2)   435        CMP    #0
0532:F0 09  053D   (3)   436        BEQ    INCEND
0534:A9 00         (2)   437        LDA    #0
0536:38            (2)   438        SEC
0537:ED 46 02      (4)   439        SBC    DUMMY
053A:8D 46 02      (4)   440        STA    DUMMY
053D:AD 46 02      (4)   441 INCEND LDA    DUMMY
0540:8D 36 02      (4)   442        STA    INC
0543:4C C4 81      (3)   443        JMP    RESALL
0546:                    444 *
0546:                    445 *CONTROL SUBROUTINE***********
0546:                    446 *
0546:A9 10         (2)   447 CONTRL LDA    #$10
0548:8D 42 02      (4)   448        STA    MINPOS
054B:AD 04 02      (4)   449        LDA    TOTPOS
054E:38            (2)   450        SEC
054F:ED 42 02      (4)   451        SBC    MINPOS
0552:8D 43 02      (4)   452        STA    MAXPOS
0555:A9 00         (2)   453 NOMVMT LDA    #0
0557:8D 0B 02      (4)   454        STA    CSTEPS
055A:8D 0C 02      (4)   455        STA    HSTEPS
055D:20 0E 06      (6)   456 CTRLTP JSR    DISPT
0560:20 82 04      (6)   457        JSR    AVGTEMP
0563:20 B4 05      (6)   458        JSR    ERRCAL
0566:AD 36 02      (4)   459        LDA    INC
0569:C9 00         (2)   460        CMP    #0
056B:F0 E8  0555   (3)   461        BEQ    NOMVMT
056D:20 FA 04      (6)   462        JSR    INCLIM
0570:AD 02 02      (4)   463        LDA    CPOS
0573:18            (2)   464        CLC
0574:6D 36 02      (4)   465        ADC    INC
0577:8D 02 02      (4)   466        STA    CPOS
057A:AD 03 02      (4)   467        LDA    HPOS
057D:38            (2)   468        SEC
057E:ED 36 02      (4)   469        SBC    INC
0581:8D 03 02      (4)   470        STA    HPOS
0584:AD 36 02      (4)   471        LDA    INC
0587:20 D8 04      (6)   472        JSR    ABS
058A:8D 0B 02      (4)   473        STA    CSTEPS
058D:8D 0C 02      (4)   474        STA    HSTEPS
0590:AD 47 02      (4)   475        LDA    ABSSGN
0593:C9 00         (2)   476        CMP    #0
0595:F0 0D  05A4   (3)   477        BEQ    TOOHOT
0597:A9 00         (2)   478 TOOCLD LDA    #0
0599:8D 25 02      (4)   479        STA    CDIR
059C:A9 01         (2)   480        LDA    #1
059E:8D 26 02      (4)   481        STA    HDIR
05A1:4C AE 05      (3)   482        JMP    CTRLND
05A4:A9 04         (2)   483 TOOHOT LDA    #4
05A6:8D 25 02      (4)   484        STA    CDIR
05A9:A9 00         (2)   485        LDA    #0
05AB:8D 26 02      (4)   486        STA    HDIR
05AE:20 92 03      (6)   487 CTRLND JSR    MOVE
05B1:4C 5D 05      (3)   488        JMP    CTRLTP
```

```
05B4:                        489 *
05B4:                        490 *ERROR CALCULATION SUBROUTINE
05B4:                        491 *
05B4:20 88 81       (6)      492 ERRCAL JSR    SAVER
05B7:AD 07 02       (4)      493         LDA    CURTMP
05BA:D8             (2)      494         CLD
05BB:38             (2)      495         SEC
05BC:ED 05 02       (4)      496         SBC    TSP
05BF:8D 06 02       (4)      497         STA    ERR
05C2:C9 00          (2)      498         CMP    #0
05C4:F0 45    060B  (3)      499         BEQ    ERRBTM
05C6:30 08    05D0  (3)      500         BMI    ERRCLD
05C8:A9 00          (2)      501 ERRHOT LDA    #0
05CA:8D 48 02       (4)      502         STA    ERRSGN
05CD:4C DE 05       (3)      503         JMP    ERDVN
05D0:A9 80          (2)      504 ERRCLD LDA    #$80
05D2:8D 48 02       (4)      505         STA    ERRSGN
05D5:A9 00          (2)      506         LDA    #0
05D7:38             (2)      507         SEC
05D8:ED 06 02       (4)      508         SBC    ERR
05DB:8D 06 02       (4)      509         STA    ERR
05DE:A9 00          (2)      510 ERDVN  LDA    #0
05E0:8D 31 02       (4)      511         STA    DHI
05E3:8D 33 02       (4)      512         STA    NUMHI
05E6:AD 08 02       (4)      513         LDA    KPRO
05E9:8D 30 02       (4)      514         STA    DLO
05EC:AD 06 02       (4)      515         LDA    ERR
05EF:8D 32 02       (4)      516         STA    NUMLO
05F2:20 AD 02       (6)      517         JSR    DIVIDE
05F5:AD 32 02       (4)      518         LDA    NUMLO
05F8:8D 36 02       (4)      519         STA    INC
05FB:AD 48 02       (4)      520         LDA    ERRSGN
05FE:C9 00          (2)      521         CMP    #0
0600:F0 09    060B  (3)      522         BEQ    ERRBTM
0602:A9 00          (2)      523         LDA    #0
0604:38             (2)      524         SEC
0605:ED 36 02       (4)      525         SBC    INC
0608:8D 36 02       (4)      526         STA    INC
060B:4C C4 81       (3)      527 ERRBTM JMP    RESALL
060E:                        528 *
060E:                        529 *SUBROUTINE DISPT
060E:                        530 *
060E:20 86 8B       (6)      531 DISPT  JSR    ACCESS
0611:A2 04          (2)      532         LDX    #4
0613:A9 20          (2)      533 DLOOP1 LDA    #$20
0615:20 47 8A       (6)      534         JSR    OUTCHR
0618:CA             (2)      535         DEX
0619:D0 F8    0613  (3)      536         BNE    DLOOP1
061B:AD 07 02       (4)      537         LDA    CURTMP
061E:20 FA 82       (6)      538         JSR    OUTBYT
0621:A9 01          (2)      539         LDA    #1
0623:8D 56 A6       (4)      540         STA    TV
0626:20 5A 83       (6)      541         JSR    DELAY
0629:60             (6)      542         RTS
062A:                        543 *
062A:                        544 *INITIALIZATION SUBROUTINE
062A:                        545 *
```

```
062A:A2 00         (2)    546 INIT    LDX     #0
062C:A9 00         (2)    547 INLOOP          LDA     #0
062E:9D 00 02      (5)    548         STA     TC,X
0631:E8            (2)    549         INX
0632:E0 50         (2)    550         CPX     #$50
0634:D0 F6   062C  (3)    551         BNE     INLOOP
0636:A9 08         (2)    552         LDA     #08
0638:8D 27 02      (4)    553         STA     CCLK
063B:A9 02         (2)    554         LDA     #02
063D:8D 28 02      (4)    555         STA     HCLK
0640:A9 00         (2)    556         LDA     #0
0642:8D 03 A8      (4)    557         STA     ADCDDX
0645:A9 FF         (2)    558         LDA     #$FF
0647:8D 02 A8      (4)    559         STA     MOTDDX
064A:8D 00 A8      (4)    560         STA     MOTOR
064D:A9 27         (2)    561         LDA     #$27
064F:8D 00 02      (4)    562         STA     TC
0652:A9 9C         (2)    563         LDA     #$9C
0654:8D 01 02      (4)    564         STA     TH
0657:A9 C0         (2)    565         LDA     #$C0
0659:8D 04 02      (4)    566         STA     TOTPOS
065C:A9 4C         (2)    567         LDA     #$4C
065E:8D 05 02      (4)    568         STA     TSP
0661:A9 05         (2)    569         LDA     #5
0663:8D 08 02      (4)    570         STA     KPRO
0666:A9 01         (2)    571         LDA     #1
0668:8D 09 02      (4)    572         STA     KINT
066B:A9 0A         (2)    573         LDA     #$0A
066D:8D 4A 02      (4)    574         STA     HCOIL1
0670:A9 09         (2)    575         LDA     #$09
0672:8D 4B 02      (4)    576         STA     HCOIL2
0675:A9 05         (2)    577         LDA     #$05
0677:8D 4C 02      (4)    578         STA     HCOIL3
067A:A9 06         (2)    579         LDA     #$06
067C:8D 4D 02      (4)    580         STA     HCOIL4
067F:A9 A0         (2)    581         LDA     #$A0
0681:8D 3A 02      (4)    582         STA     CCOIL1
0684:A9 90         (2)    583         LDA     #$90
0686:8D 3B 02      (4)    584         STA     CCOIL2
0689:A9 50         (2)    585         LDA     #$50
068B:8D 3C 02      (4)    586         STA     CCOIL3
068E:A9 60         (2)    587         LDA     #$60
0690:8D 3D 02      (4)    588         STA     CCOIL4
0693:A9 01         (2)    589         LDA     #1
0695:8D 4E 02      (4)    590         STA     COLDJ
0698:8D 4F 02      (4)    591         STA     HOTJ
069B:60            (6)    592         RTS

** SUCCESSFUL ASSEMBLY := NO ERRORS
** ASSEMBLER CREATE ON 15-JAN-84 21:28
** TOTAL LINES ASSEMBLED    614
** FREE SPACE PAGE COUNT    79

```

What is claimed is:

1. A faucet with computer controlled temperature comprising:

a hot fluid supply connection, for supplying hot fluid to said faucet;

a cold fluid supply connection, for supplying cold fluid to said faucet;

hot and cold fluid valves connected, respectively, to said hot and cold fluid supply connections, said hot and cold valves each having a valve seat and a valve member movable with respect to said valve seat to control a flow of fluid through said valve, with each said valve member being further disposed so that one of its ends is threaded and so that the opposite end thereof has attached thereto a seal which is engagable with said associated valve seat;

first and second stepper motors connected, respectively, to said hot and cold fluid valves for moving said hot and cold valve members, respectively, in relationship to their associated valve seats, said stepper motors each having a shaft and a threaded connection fixed to said shaft, each stepper motor shaft having a knob connected thereto for manual rotation of said shaft, and said threaded connection being disposed in threaded engagement with said threaded end of said valve member;

a mixing connection connected between said hot and cold fluid valves, for receiving the flow of hot and cold fluids and mixing them together and discharging them as a mixed flow of fluid;

a temperature sensor connected to said mixing connection for generating an analog signal corresponding to the actual temperature of the mixed fluid;

analog-to-digital conversion means connected to said temperature sensor for converting said analog signal into a digital temperature signal corresponding to the actual temperature of the mixed fluid;

a microcomputer connected to said conversion means for computing an error value between the actual temperature and a selected temperature and for applying a digitally implemented feedback control algorithm to said error value to generate a feedback control signal for controlling the fluid flow through said hot and cold valves; and logic means connected to said microprocessor and also to said first and second stepper motors, for receiving said control signal and for controlling said stepper motors in response to said control signal, to move said hot and cold valve members so as to cause the actual temperature of the mixed fluid to approach the selected temperature therefor.

2. The faucet of claim 1 wherein said microcomputer is programmed to digitally implement a proportional plus integral type of feedback control algorithm.

3. The faucet of claim 1 wherein said logic means comprises at least two flip-flops for each stepper motor, with each flip-flop having an inverting and a non-inverting output, and a plurality of power transistors disposed so that each output of each flip-flop is connected to one of said stepper motors by one of said transistors.

4. The faucet of claim 3 wherein each said flip-flop output is connected through an associated inverter to the base of said transistor which connects said flip-flop output to said stepper motor, and wherein a control input of each said flip-flop is connected to the output of an associated exclusive OR gate, with one input of each said exclusive OR gate being connected to said control signal from said microcomputer and the other input of said exclusive OR gate being connected to one of the inverting or non-inverting outputs of said flip-flops, so as to selectively power predetermined ones of said transistors in response to corresponding control signals from said microcomputer.

5. A temperature controlled fluid system comprising:

a hot fluid supply connection;

a cold fluid supply connection;

a mixing connection for receiving the flow of hot and cold fluids and mixing them together and discharging them as a mixed flow of fluid;

hot and cold fluid valves positioned, respectively, between said hot and cold fluid supply connections and said mixing connection, said hot and cold valves each having a valve seat and a valve member movable with respect to said valve seat to control a flow of fluid through said valve, with each said valve member being further disposed so that one of its ends is threaded and so that the opposite end thereof has attached thereto a seal which is engagable with said associated valve seat;

first and second stepper motors connected, respectively, to said hot and cold fluid valves for moving said hot and cold valve members, respectively, in relationship to their associated valve seats, said stepper motors each having a shaft and a threaded connection fixed to said shaft, each stepper motor shaft having a knob connected thereto for manual rotation of said shaft, and said threaded connection being disposed in threaded engagement with said threaded end of said valve member;

a temperature sensor connected to said mixing connection for generating an analog signal corresponding to the actual temperature of the mixed fluid;

analog-to-digital conversion means connected to said temperature sensor for converting said analog signal into a digital temperature signal corresponding to the actual temperature of the mixed fluid;

keyboard means for entering a selected value for the desired temperature of the mixed flow of fluid and for generating a selected temperature signal corresponding to the value of the selected temperature;

a microcomputer connected to said conversion means and also to said keyboard means, for receiving said generated selected temperature signal, for receiving said digital temperature signal from said analog-to-digital conversion means, for computing an error value between the digital temperature signal and the generated selected temperature signal, and for applying a digitally implemented feedback control algorithm to said error value to generate a feedback control signal for controlling the fluid flow through said hot and cold valves; and logic means connected to said microcomputer and also to said first and second stepper motors, for receiving said control signal and for controlling said stepper motors in response to said control signal, to move said hot and cold valve members so as to cause the actual temperature of the mixed fluid to approach the selected temperature thereof.

6. The system of claim 5 wherein said microcomputer is programmed to digitally implement a proportional plus integral type of feedback control algorithm.

7. The system of claim 5 wherein said logic means comprises at least two flip-flops for each stepper motor, with each flip-flop having an inverting and a non-inverting output, and a plurality of power transistors disposed so that each output of each flip-flop is connected to one of said stepper motors by one of said transistors.

8. The system of claim 7 wherein each said flip-flop output is connected through an associated inverter to the base of said transistor which connects said flip-flop output to said stepper motor, and wherein a control input of each said flip-flop is connected to the output of an associated exclusive OR gate, with one input of each said exclusive OR gate being connected to said control signal from said microcomputer and the other input of said exclusive OR gate being connected to one of the inverting or non-inverting outputs of said flip-flops, so as to selectively power predetermined ones of said transistors in response to corresponding control signals from said microcomputer.

* * * * *